United States Patent
Chang et al.

(10) Patent No.: US 11,170,733 B2
(45) Date of Patent: Nov. 9, 2021

(54) PROJECTOR AND PROJECTION METHOD THEREOF

(71) Applicant: Coretronic Corporation, Hsin-Chu (TW)

(72) Inventors: Hsin-Yueh Chang, Hsin-Chu (TW); Li-Ming Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/986,284

(22) Filed: Aug. 6, 2020

(65) Prior Publication Data

US 2021/0049976 A1 Feb. 18, 2021

(30) Foreign Application Priority Data

Aug. 15, 2019 (CN) .......................... 201910751803.3

(51) Int. Cl.
*G09G 5/00* (2006.01)
*H04N 7/01* (2006.01)
*H04N 5/74* (2006.01)

(52) U.S. Cl.
CPC .............. *G09G 5/005* (2013.01); *H04N 5/74* (2013.01); *H04N 7/0132* (2013.01); *G09G 2340/0435* (2013.01)

(58) Field of Classification Search
CPC ...... H04N 5/74; H04N 7/0132; H04N 9/3188; H04N 9/3141; H04N 9/3179; H04N 9/315; G09G 2340/0435; G09G 2340/0407

See application file for complete search history.

(56) References Cited

U.S. PATENT DOCUMENTS

| 5,706,061 A | * | 1/1998 | Marshall | H04N 9/3114 348/742 |
| 5,921,650 A | * | 7/1999 | Doany | H04N 9/3114 353/31 |
| 5,943,036 A | * | 8/1999 | Tanaka | G09G 5/006 345/620 |
| 6,157,396 A | * | 12/2000 | Margulis | G06T 1/20 345/506 |

(Continued)

FOREIGN PATENT DOCUMENTS

| CN | 1873769 | 6/2010 |
| TW | 200614066 | 5/2006 |

*Primary Examiner* — Paulos M Natnael
(74) *Attorney, Agent, or Firm* — JCIPRNET

(57) ABSTRACT

A projector and a projection method are provided. The projector is coupled to a display card and includes a light source, a light valve, a projection lens, and a processor. The light source provides an illumination beam. The light valve converts the illumination beam into an image beam. The projection lens projects the image beam to the outside of the projector to form an imaged image. The processor receives an input image signal from the display card, and generates a control signal corresponding to the input image signal according to a refresh rate of the input image signal. When the refresh rate is greater than a threshold, the imaged image has a first resolution. When the refresh rate is less than the threshold, the light valve performs a pixel shifting operation, so that the imaged image has a second resolution. The first resolution is less than the second resolution.

12 Claims, 3 Drawing Sheets

(56) References Cited

U.S. PATENT DOCUMENTS

| | | | | |
|---|---|---|---|---|
| 6,217,174 B1* | 4/2001 | Knox | .................... | H04N 9/3114 |
| | | | | 348/E9.027 |
| 9,183,771 B2* | 11/2015 | Majumder | ............ | H04N 9/3188 |
| 2004/0090679 A1* | 5/2004 | Kowarz | ................ | H04N 9/3132 |
| | | | | 359/634 |
| 2011/0090465 A1* | 4/2011 | Watanabe | ............... | G03B 21/28 |
| | | | | 353/31 |
| 2011/0285757 A1* | 11/2011 | Cummings | ........... | G09G 3/2003 |
| | | | | 345/690 |
| 2012/0306926 A1* | 12/2012 | Millet | .................... | G06T 3/4007 |
| | | | | 345/660 |
| 2013/0194295 A1* | 8/2013 | Chan | ..................... | G09G 3/3466 |
| | | | | 345/619 |
| 2015/0194125 A1* | 7/2015 | Choi | ...................... | G09G 5/003 |
| | | | | 345/204 |
| 2015/0235445 A1* | 8/2015 | Schowengerdt | ........ | H04N 5/225 |
| | | | | 345/611 |
| 2020/0077063 A1* | 3/2020 | Yamasaki | ............. | G03B 21/147 |
| 2020/0335058 A1* | 10/2020 | Hu | ........................ | G09G 3/2014 |
| 2021/0049976 A1* | 2/2021 | Chang | .................. | H04N 7/0132 |

* cited by examiner

PROJECTOR AND PROJECTION METHOD THEREOF

CROSS-REFERENCE TO RELATED APPLICATION

This application claims the priority benefit of China application serial no. 201910751803.3, filed on Aug. 15, 2019. The entirety of the above-mentioned patent application is hereby incorporated by reference herein and made a part of this specification.

BACKGROUND OF THE INVENTION

1. Field of the Invention

The invention relates to a projector and a projection method, and in particular, to a projector having a plurality of projection modes, and a projection method.

2. Description of Related Art

With the evolution of science and technology, high-resolution (e.g., 4K) display devices (e.g., projectors) have been developed successively. The high-resolution projectors can greatly enhance the visual experiences of users. On the other hand, as the influence of games on the economy and society has gradually increased, the electronic sports industry has emerged. For the application of electronic sports, the magnitude of resolution of a display frame is not the main consideration, but the response speed and frame correctness of the display device are the most important considerations. However, there is currently no single projector capable of meeting the demands of high resolution and high response speed simultaneously.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

In view of this, the invention provides a projector and a projection method, where an image with high resolution and high response speed can be provided through a single projector.

The invention provides a projector, coupled to a display card. The projector includes a light source, a light valve, a projection lens, and a processor. The light source is configured to provide an illumination beam. The light valve is provided on a transmission path of the illumination beam and configured to convert the illumination beam into an image beam according to a control signal. The projection lens is provided on a transmission path of the image beam, and configured to project the image beam to the outside of the projector to form an imaged image. The processor is coupled to the light valve, and receives an input image signal from the display card. The processor generates the control signal corresponding to the input image signal according to a refresh rate of the input image signal. When the refresh rate is greater than a threshold, the imaged image has a first resolution. When the refresh rate is less than the threshold, the light valve performs a pixel shifting operation, so that the imaged image has a second resolution. The first resolution is less than the second resolution.

The invention provides a projection method, applicable to a projector. The projector is coupled to a display card. The projector includes a light source, a light valve, a projection lens, and a processor. The processor is coupled to the light valve. The projection method includes: providing, by the light source, an illumination beam; converting the illumination beam into an image beam according to a control signal by providing the light valve on a transmission path of the illumination beam; projecting the image beam to the outside of the projector to form an imaged image by providing the projection lens on a transmission path of the image beam; and receiving, by the processor, an input image signal from the display card, and generating, by the processor, the control signal corresponding to the input image signal according to a refresh rate of the input image signal. When the refresh rate is greater than a threshold, the imaged image has a first resolution. When the refresh rate is less than the threshold, the light valve performs a pixel shifting operation, so that the imaged image has a second resolution. The first resolution is less than the second resolution.

Based on the above, according to the projector and the projection method of the invention, a processor of the projector generates the control signal corresponding to the input image signal according to the refresh rate of the input image signal. The light valve of the projector converts the illumination beam into the image beam according to the control signal, and the projection lens of the projector projects the image beam to the outside of the projector to form the imaged image. When the refresh rate is greater than a threshold, the imaged image has a first resolution. When the refresh rate is less than the threshold, the light valve performs the pixel shifting operation, so that the imaged image has a second resolution. The first resolution is less than the second resolution. In this way, high-definition imaging or high-refresh rate imaging can be performed according to a determination result without increasing the resolution specification of the light valve, so that the light valve of the same specification achieves more benefits.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
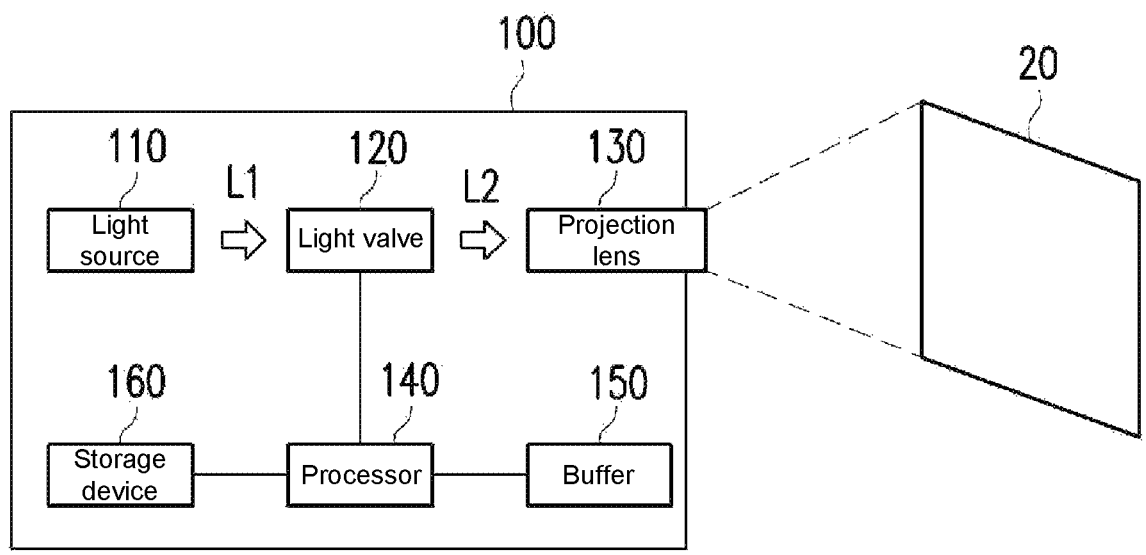
FIG. 1 is a block diagram of a projector according to an embodiment of the invention.

FIG. 1 is a block diagram of a projector 100 according to an embodiment of the invention.

Referring to FIG. 1, the projector 100 is coupled to a display card (not shown in the figure), and includes a light source 110, a light valve 120, a projection lens 130, a processor 140, a buffer 150, and a storage device 160. The display card refers to the source of an image signal. The display card is, for example, provided in a personal computer or a portable computer, and coupled to the projector 100 by the personal computer or the portable computer. The so-called coupling may be defined as transfer of an electrical signal or data. The processor 140 is coupled to the light valve 120, the buffer 150 and the storage device 160. The light source 110 provides an illumination beam L1. The light valve 120 is provided on a transmission path of the illumination beam L1, and controls, according to a control signal of the processor 140, the light valve 120 to convert the illumination beam L1 into an image beam L2. The projection lens 130 is provided on a transmission path of the image beam L2, and projects the image beam L2 to the outside of the projector 100 to form an imaged image 20.

The light source 110 is, for example, a bulb, a light emitting diode (LED), a laser diode (LD), or other similar light emitting elements. The light valve 120 is, for example, a digital micromirror device (DMD), a reflective liquid crystal on silicon (LCOS) device, a transparent liquid crystal panel, or other similar elements. The processor 140 is, for example, a micro controller unit (MCU), or other programmable general-purpose or special-purpose microprocessors, digital signal processors (DSP), programmable controllers, application specific integrated circuits (ASIC), programmable logic devices (PLD), or other similar devices or processing software or control software, but the invention is not limited to the above hardware or software. The storage device 160 is, for example, a programmable read only memory (PROM), an electronically erasable programmable read only memory (EEPROM), or other similar elements. In the present embodiment, the buffer 150 is, for example, a memory in which output or input data is temporarily placed. The buffer 150 is provided outside the processor 140 and coupled to the processor 140, but the invention is not limited thereto. In another embodiment, the buffer 150 may also be provided in the processor 140 or in the storage device 160.

The processor 140 may receive an input image signal from a display card (not shown) provided outside the projector 100, and generate a control signal corresponding to the input image signal according to a refresh rate of the input image signal. When the refresh rate is greater than a threshold, the imaged image 20 has a first resolution. When the refresh rate is less than the threshold, the light valve 120 performs a pixel shifting operation, so that the imaged image 20 has a second resolution. The first resolution is less than the second resolution. In detail, the light valve 120 may use the same light valve refresh rate such that the imaged image 20 has a first resolution or a second resolution.

Figure 2:
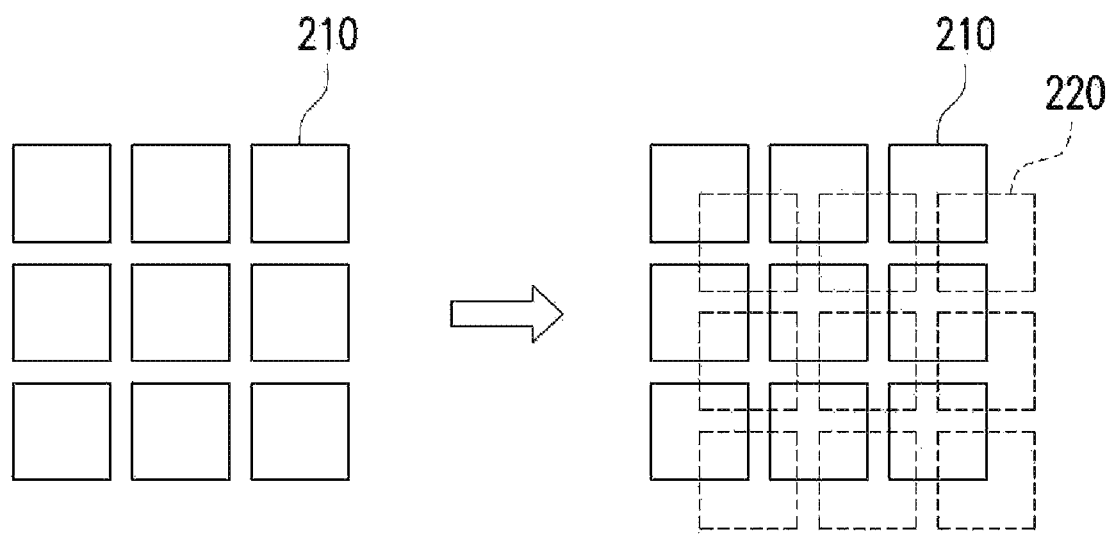
FIG. 2 is a schematic diagram showing an example of resolution up-sampling according to an embodiment of the invention.

In an embodiment, when the processor 140 receives an input image signal, the processor 140 may convert the resolution of the input image signal into a preset resolution (e.g., 1080P resolution) in advance. When the processor 140 determines that the refresh rate (e.g., 60 Hz) of the input image signal is less than a threshold (e.g., 100 Hz), the processor 140 may instruct the light valve 120 to perform a pixel shifting operation. The pixel shifting operation includes resolution up-sampling. FIG. 2 is a schematic diagram showing an example of resolution up-sampling according to an embodiment of the invention. Referring to FIG. 2, the processor 140 may instruct the light valve 120 to cooperate with the projection lens 130 to shift an original image pixel 210 of a 1080P-resolution image diagonally by half a pixel to obtain a displacement image pixel 220, so that the resolutions in a horizontal direction and a vertical direction are simultaneously doubled to obtain a 4K-resolution image. For example, the pixel shifting operation may be implemented by digital or optical technologies known to those skilled in the art such as expanded pixel resolution (XPR), pixel shift (e-shift), or 4K enhancement.

Figure 3:
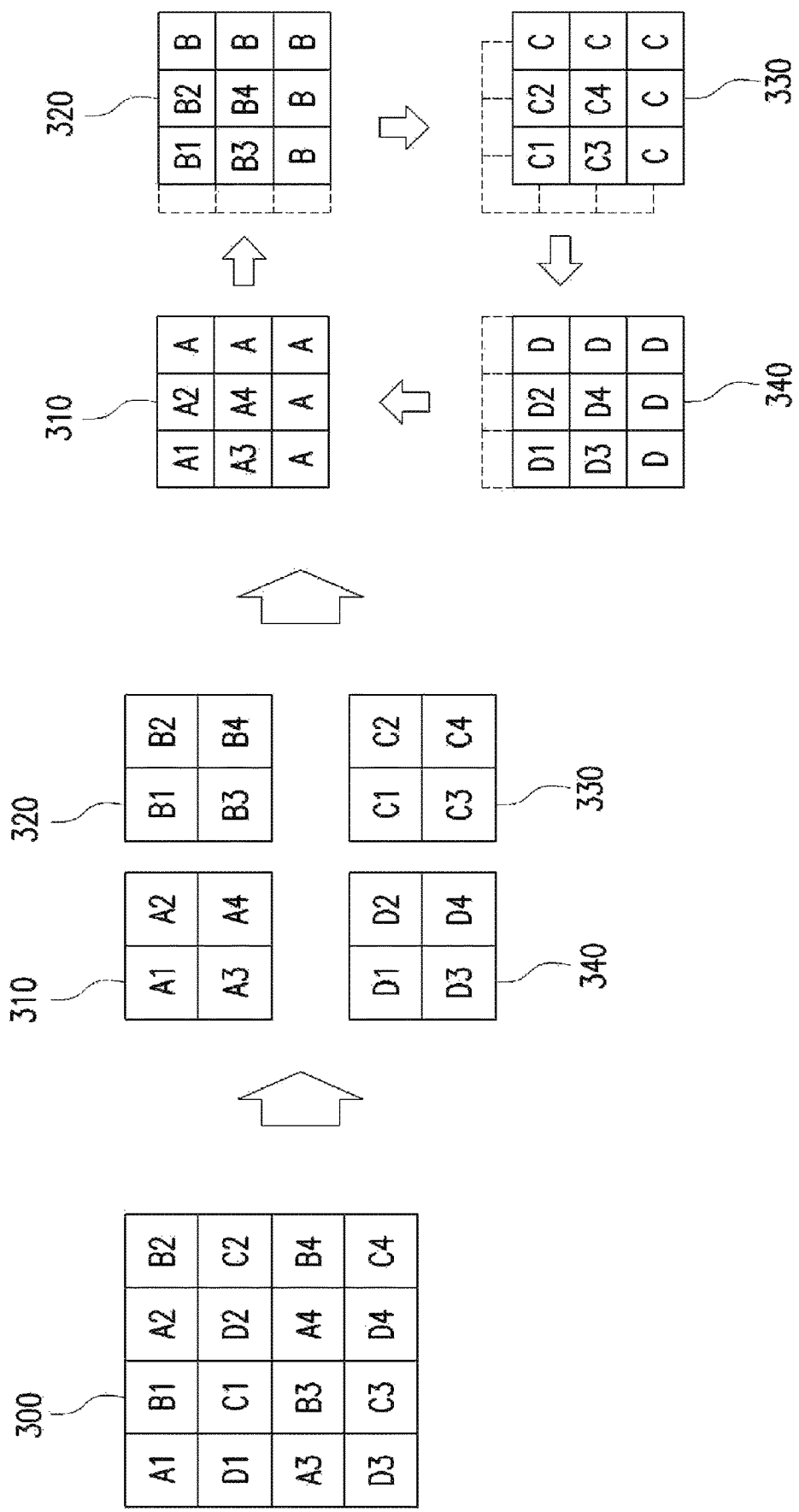
FIG. 3 is a schematic diagram showing an example of a pixel shifting operation according to an embodiment of the invention.

Specifically, the pixel shifting operation may include: dividing each frame of the input image signal into a plurality of sub-frames, and projecting the sub-frames with a displacement shift by half a pixel. FIG. 3 is a schematic diagram showing an example of a pixel shifting operation according to an embodiment of the invention. Referring to FIG. 3, the pixel shifting operation includes: dividing a 4K-resolution and 60 Hz-refresh rate frame 300 into a sub-frame 310, a sub-frame 320, a sub-frame 330, and a sub-frame 340, and sequentially projecting the sub-frame 310, the sub-frame 320, the sub-frame 330, and the sub-frame 340 with 1080P resolution and 240 Hz. The projected sub-frame 320 is shifted rightwards by half a pixel from the sub-frame 310. The projected sub-frame 330 is shifted downwards by half a pixel from the sub-frame 320. The projected sub-frame 340 is shifted leftwards by half a pixel from the sub-frame 330. The projected sub-frame 310 is shifted upwards by half a pixel from the sub-frame 340. Due to the effect of persistence of vision, the sub-frame 310, the sub-frame 320, the sub-frame 330, and the sub-frame 340 that are sequentially displayed at a refresh rate of 240 Hz can bring a visual effect of 4K resolution to users. Although the resolution of the imaged image 20 is quadrupled by the pixel shifting operation by the light valve 120 in the present embodiment, the invention is not limited thereto. In other embodiments, the resolution of the imaged image 20 may be increased to other multiples (e.g., double or octuple) by other operations on the pixel through the light valve 120.

When the processor 140 determines that the refresh rate (e.g., 240 Hz) of the input image signal is larger than a threshold (e.g., 100 Hz), the processor 140 may instruct the light valve 120 to project the 1080P-resolution imaged image 20 at a refresh rate of 240 Hz by means of the projection lens 130 without performing the pixel shifting operation. In this way, when the imaged image 20 has a 1080P resolution (first resolution) or a 4 k resolution (or second resolution), the imaged image 20 is projected at the same light valve refresh rate (e.g., 240 Hz). Specifically, the light valve 120 is configured to convert the illumination beam L1 into the image beam L2. Each image beam L2 may correspond to a frame or a sub-frame. The light valve refresh rate may refer to the number of frames which can be imaged by the light valve 120 per second.

In an embodiment, when the refresh rate is greater than the threshold and the refresh rate is greater than a predetermined rate, the processor 140 obtains, from the buffer 150 of the projector 100, a latest frame of the input image signal received from the display card, and transmits the latest frame to the light valve 120. Specifically, the refresh rate of the input image signal transmitted by the display card may be greater than a maximum refresh rate (i.e., predetermined rate) that can be supported by the light valve 120. In this case, the processor 140 may perform a fast synchronization operation. Specifically, when the refresh rate (e.g., 300 Hz) of the input image signal is greater than a threshold (e.g., 100 Hz) and the refresh rate (e.g., 300 Hz) of the input image signal is greater than a predetermined rate (e.g., 240 Hz, or referred to as a maximum refresh rate that can be supported by the light valve 120), the processor 140 obtains, from the buffer 150 of the projector 100, a latest frame of the input image signal received from the display card every 1/240 seconds, and transmits the latest frame to the light valve 120.

In an embodiment, the storage device 160 may store identification data. The identification data is, for example, extended display identification data (EDID). The identification data includes at least a high-definition mode and a high-refresh rate mode. When the processor 140 determines that the refresh rate of the input image signal is greater than the threshold, the processor 140 may access configuration data corresponding to the high-refresh rate mode, and instruct the light valve 120 to cooperate with the projection lens 130 to project an imaged image 20 with a high refresh rate (e.g., 240 Hz). When the processor 140 determines that the refresh rate of the input image signal is less than the threshold, the processor 140 may access configuration data corresponding to the high-definition mode, and instruct the light valve 120 to perform a pixel shifting operation to project an imaged image 20 with high definition (e.g., 4K resolution) by cooperating with the projection lens 130.

Figure 4:
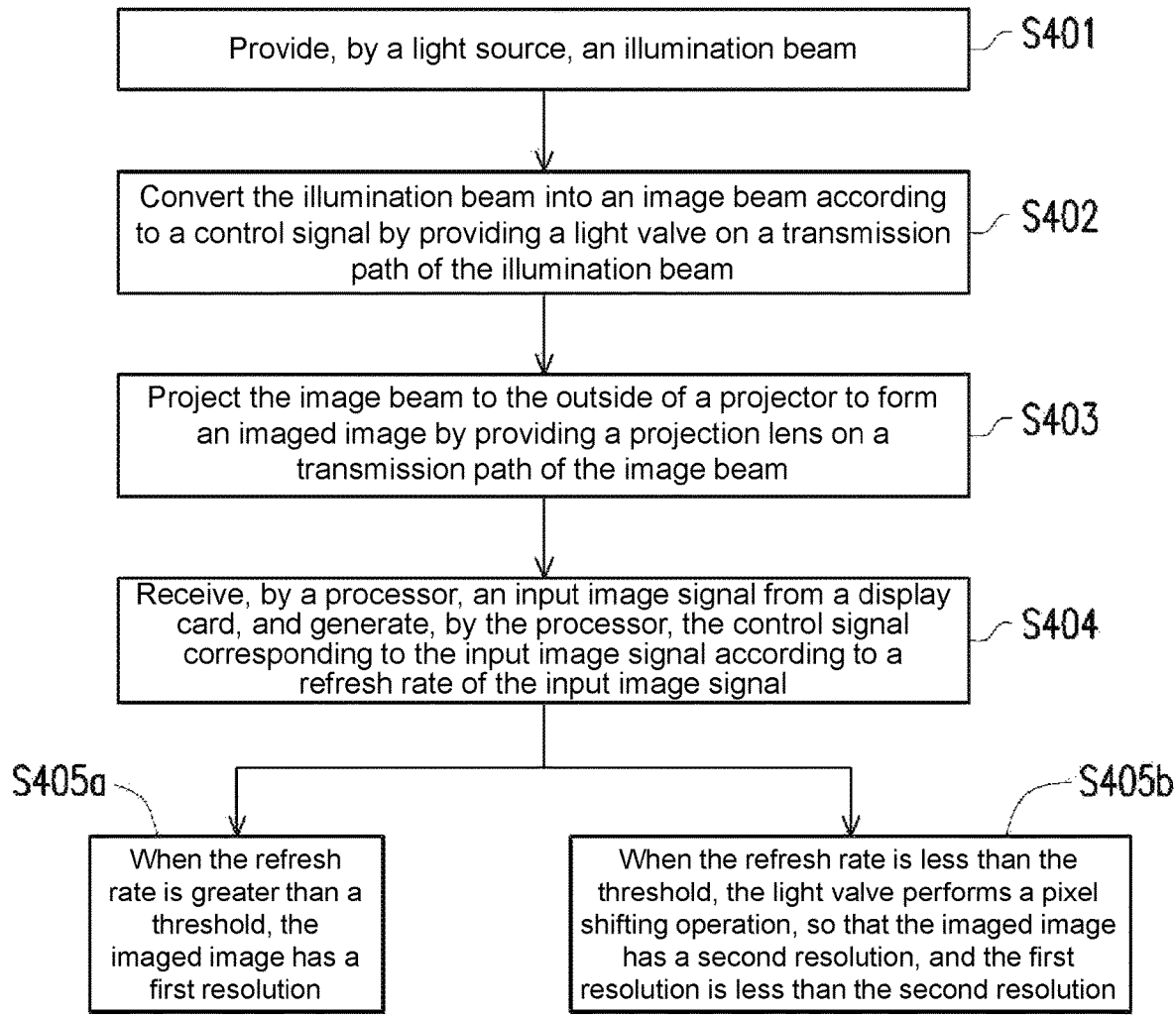
FIG. 4 is a flow chart of a projection method according to an embodiment of the invention.

FIG. 4 is a flow chart of a projection method according to an embodiment of the invention.

Referring to FIG. 4, in step S401, a light source provides an illumination beam.

In step S402, the illumination beam is converted into an image beam according to a control signal by providing a light valve on a transmission path of the illumination beam.

In step S403, the image beam is projected to the outside of the projector to form an imaged image by providing a projection lens on a transmission path of the image beam.

In step S404, a processor receives an input image signal from a display card, and the processor generates the control signal corresponding to the input image signal according to a refresh rate of the input image signal.

In step S405a, when the refresh rate is greater than a threshold, the imaged image has a first resolution. In step S405b, when the refresh rate is less than the threshold, the light valve performs a pixel shifting operation, so that the imaged image has a second resolution, and the first resolution is less than the second resolution.

Based on the above, according to the projector and the projection method of the invention, a processor of the projector generates the control signal corresponding to the input image signal according to the refresh rate of the input image signal. The light valve of the projector converts the illumination beam into the image beam according to the control signal, and the projection lens of the projector projects the image beam to the outside of the projector to form the imaged image. When the refresh rate is greater than a threshold, the imaged image has a first resolution. When the refresh rate is less than the threshold, the light valve performs a pixel shifting operation, so that the imaged image has a second resolution. The first resolution is less than the second resolution. According to the projector and the projection method of the invention, a high-definition mode and a high-refresh rate mode may be automatically switched according to the refresh rate of the input image signal, so that a single projector meets different demands of users.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A projector, coupled to a display card, the projector comprising a light source, a light valve, a projection lens, and a processor, wherein
the light source is configured to provide an illumination beam;
the light valve is provided on a transmission path of the illumination beam and configured to convert the illumination beam into an image beam according to a control signal;
the projection lens is provided on a transmission path of the image beam, and configured to project the image beam to the outside of the projector to form an imaged image; and the processor is coupled to the light valve, receives an input image signal from the display card, and generates the control signal corresponding to the input image signal according to a refresh rate of the input image signal, wherein when the refresh rate is greater than a threshold, the imaged image has a first resolution; and when the refresh rate is less than the threshold, the light valve performs a pixel shifting operation, so that the imaged image has a second resolution, and the first resolution is less than the second resolution.

2. The projector according to claim 1, wherein the pixel shifting operation comprises dividing each frame of the input image signal into a plurality of sub-frames, and the plurality of sub-frames are projected with a displacement shift by half a pixel such that the imaged image has the second resolution.

3. The projector according to claim 2, wherein when the imaged image has the first resolution or the second resolution, the imaged image is projected with a same light valve refresh rate.

4. The projector according to claim 1, wherein the processor comprises a buffer, and when the refresh rate is greater than the threshold and the refresh rate is greater than a predetermined rate, the processor obtains, from the buffer of the projector, a latest frame of the input image signal received from the display card, and transmits the latest frame to the light valve.

5. The projector according to claim 1, further comprising a storage device, wherein the storage device is coupled to the processor for storing identification data, and the identification data comprises at least a high-definition mode and a high-refresh-rate mode.

6. The projector according to claim 1, wherein the identification data is extended display identification data.

7. A projection method, applicable to a projector, the projector being coupled to a display card, the projector comprising a light source, a light valve, a projection lens, and a processor, the processor being coupled to the light valve, the projection method comprising:

providing, by the light source, an illumination beam;

converting the illumination beam into an image beam according to a control signal by providing the light valve on a transmission path of the illumination beam;

projecting the image beam to the outside of the projector to form an imaged image by providing the projection lens on a transmission path of the image beam; and receiving, by the processor, an input image signal from the display card, and generating, by the processor, the control signal corresponding to the input image signal according to a refresh rate of the input image signal, wherein when the refresh rate is greater than a threshold, the imaged image has a first resolution; and when the refresh rate is less than the threshold, the light valve performs a pixel shifting operation, so that the imaged image has a second resolution, and the first resolution is less than the second resolution.

8. The projection method according to claim 7, wherein the pixel shifting operation comprises dividing each frame of the input image signal into a plurality of sub-frames, and the plurality of sub-frames are projected with a displacement shift by half a pixel such that the imaged image has the second resolution.

9. The projection method according to claim 8, wherein when the imaged image has the first resolution or the second resolution, the imaged image is projected with a same light valve refresh rate.

10. The projection method according to claim 7, wherein the processor comprises a buffer, and the projection method comprises: when the refresh rate is greater than the threshold and the refresh rate is greater than a predetermined rate, obtaining, by the processor from the buffer of the projector, a latest frame of the input image signal received from the display card, and transmitting the latest frame to the light valve.

11. The projection method according to claim 7, wherein the projector further comprises a storage device which is coupled to the processor, and the projection method comprises: storing, by the storage device, identification data, and the identification data comprises at least a high-definition mode and a high-refresh rate mode.

12. The projection method according to claim 7, wherein the identification data is extended display identification data.

* * * * *